US005413402A

United States Patent [19]

Flerchinger et al.

[11] Patent Number: 5,413,402

[45] Date of Patent: May 9, 1995

[54] SEQUENCED TAILGATE LOCK

[75] Inventors: Gary G. Flerchinger, Hixson; Jerald G. Zanzig, Signal Mountain, both of Tenn.

[73] Assignee: The Heil Company, Chattanooga, Tenn.

[21] Appl. No.: 53,907

[22] Filed: Apr. 27, 1993

[51] Int. Cl.[6] .............................................. B60P 1/273

[52] U.S. Cl. .................................. 298/23 M; 49/395; 105/310.2; 105/395; 292/DIG. 23

[58] Field of Search ...................... 49/395; 292/32, 33, 292/DIG. 23; 298/23 M, 235, 23 A, 23 B, 23 F; 105/310.2, 395

[56] References Cited

U.S. PATENT DOCUMENTS

| | | | |
|---|---|---|---|
| 2,558,867 | 7/1951 | May et al. . | |
| 3,111,346 | 11/1963 | Harbers et al. | 298/23 MX |
| 4,068,769 | 1/1978 | Sweet et al. | 298/23 MX |
| 4,109,963 | 8/1978 | Sieving et al. | 298/23 M |

FOREIGN PATENT DOCUMENTS 2093902 9/1982 United Kingdom .

*Primary Examiner*—Michael S. Huppert
*Assistant Examiner*—Janice L. Krizek
*Attorney, Agent, or Firm*—McAndrews, Held & Malloy, Ltd.

[57] ABSTRACT

A tailgate locking mechanism is provided for locking the tailgate in a closed position against the rear end of the body of a rear loading refuse collection vehicle. The locking mechanism includes at least two fluid operated piston and cylinder locking assemblies, at least one of which is visible to the vehicle operator. Actuation of the piston and cylinder assemblies is sequenced so that the visible piston and cylinder assembly is extended only after the remote, or non-visible piston and cylinder assembly is extended, and is retracted only after the non-visible piston and cylinder assembly is retracted.

21 Claims, 4 Drawing Sheets

SEQUENCED TAILGATE LOCK

TECHNICAL FIELD

The invention relates to locking mechanisms, and in particular, to a tailgate locking mechanism for a refuse collection vehicle.

BACKGROUND OF THE INVENTION

Refuse collection vehicles with which the present invention is concerned are of the type that include a wheel-supported vehicle chassis, a refuse container body mounted on the vehicle chassis and having an open end, and a tailgate mounted to the body so as to close the open end. Typically, the open end is the rear end of the refuse container body. The tailgate has an upper edge that is pivotally mounted to the top of the container body and can be swung upwardly to uncover the open rear end to allow refuse to be discharged from the container body.

Locking mechanisms for locking the tailgate in a closed position against the rear end of the body are known in the art. One type of locking mechanism comprises a screw threaded member pivotally mounted on each side of the container body and manually rotated into position with an apertured bracket positioned on each side of the tailgate. This arrangement has the disadvantage of requiring the vehicle operator to manually lock or unlock first one side of the tailgate and then walk around to the other side to perform the locking/unlocking procedure, resulting in a time-consuming and cumbersome procedure.

Another type of locking mechanism is disclosed in U.S. Pat. No. 3,873,149, wherein power actuated rams release the tailgate from the body and pivot the tailgate first into a raised open position and then down into a locked closed position. Another power actuated locking mechanism is disclosed in GB 2093902 wherein a piston and cylinder assembly acts on a spring loaded plunger to withdraw the plunger from a bracket on the container body to unlock the tailgate.

Although these mechanisms have the advantage of allowing the operator to perform the locking/unlocking procedure from one side of the vehicle by using power controls, the operator must still walk around to the other side of the vehicle to visually check the remote lock cylinder to confirm that the lock cylinder is either in the locked or unlocked position.

One solution to overcome the visual inspection drawback has been to employ multiple sensors to detect the different positions of all the lock cylinders. Such sensors, however, can be subject to mechanical or electrical failure, and increase the cost of the vehicle.

SUMMARY OF THE INVENTION

It is, accordingly, an object of the present invention to provide a tailgate locking mechanism that does not require visual inspection of a remote or hidden lock cylinder to determine the locking position.

Another object of the invention is to provide a completely hydraulic locking mechanism that does not require any separate sensors.

Another object of the invention is to provide a hydraulic tailgate locking mechanism that operates sequentially so that a second hydraulic latch, which is visible to the operator, is not actuated until the first latch, which is on the opposite side and not visible to the operator, has been actuated.

A further object of the invention is to provide a locking mechanism that is simple, reliable, and cost effective.

These and other objects and advantages of the present invention are provided by a tailgate lock mechanism for a refuse collection vehicle of the type having a container body with an open end and a tailgate mounted to the container body so that the tailgate can be moved between a closed position, when the tailgate covers the open end, and an open position, when the tailgate is opened to uncover the open end. The locking mechanism includes first and second means for locking the tailgate into the closed position, the first and second locking means being moveable between a tailgate locked position and a tailgate unlocked position. First and second means for selectively moving the first and second locking means are provided so that the second locking means is moved to its tailgate locked position only after the first locking means is moved to its tailgate locked position.

In a preferred embodiment, the first and second means for locking comprise first and second fluid operated piston and cylinder assemblies, each of which includes a piston assembly comprising a piston and a piston rod. The piston and cylinder assemblies are mounted on the tailgate and positioned so that the piston rod of the first piston and cylinder assembly projects into a first apertured latch bracket when the piston is fully extended and the piston rod of a second piston and cylinder assembly projects into the second apertured latch bracket when the piston is fully extended to lock the tailgate into the closed position.

DESCRIPTION OF THE PREFERRED EMBODIMENT

Figure 1:
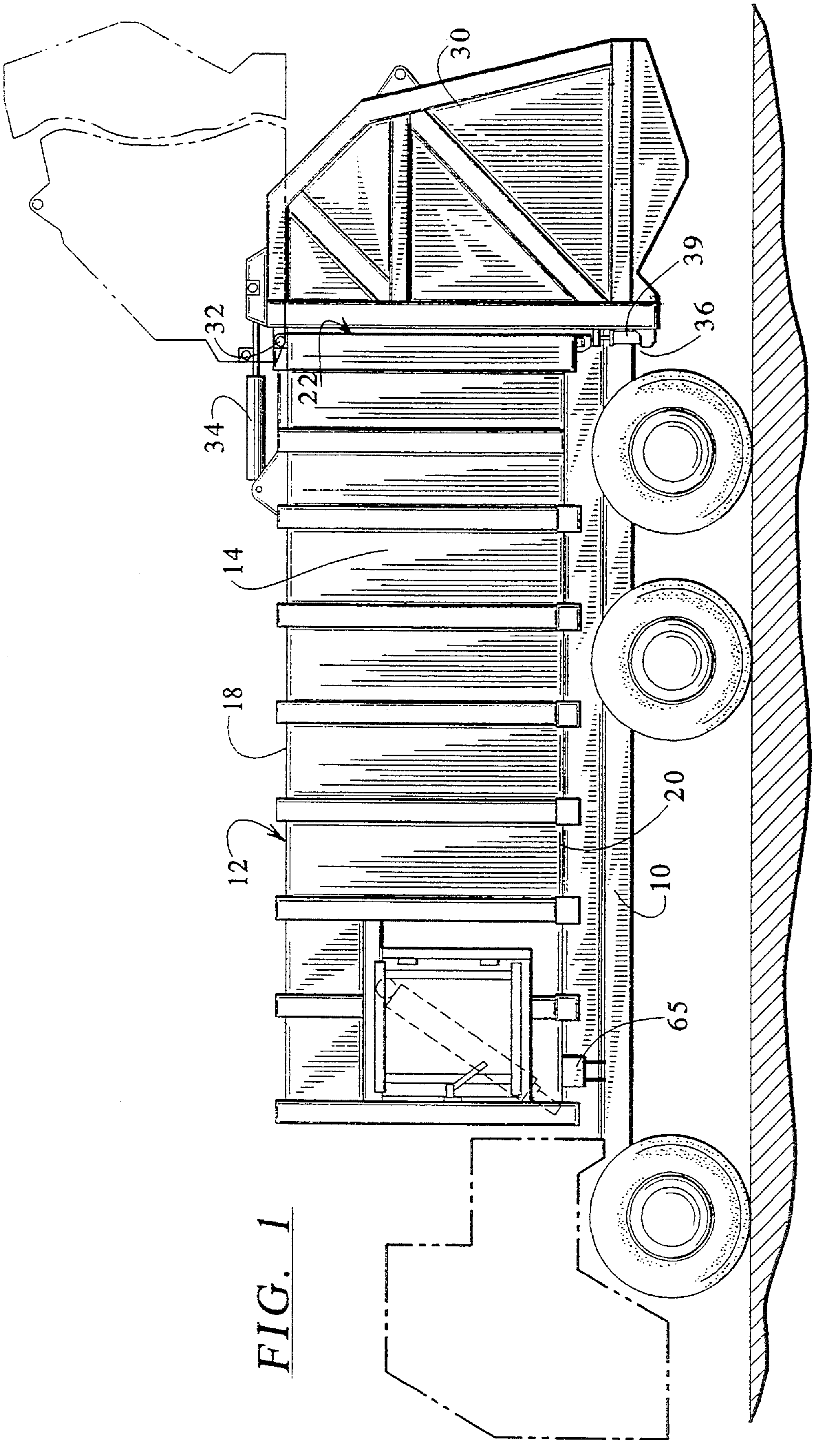
FIG. 1 is a side view of a rear-loading refuse collection vehicle on which the tailgate locking mechanism of the present invention is utilized.
Figure 2:
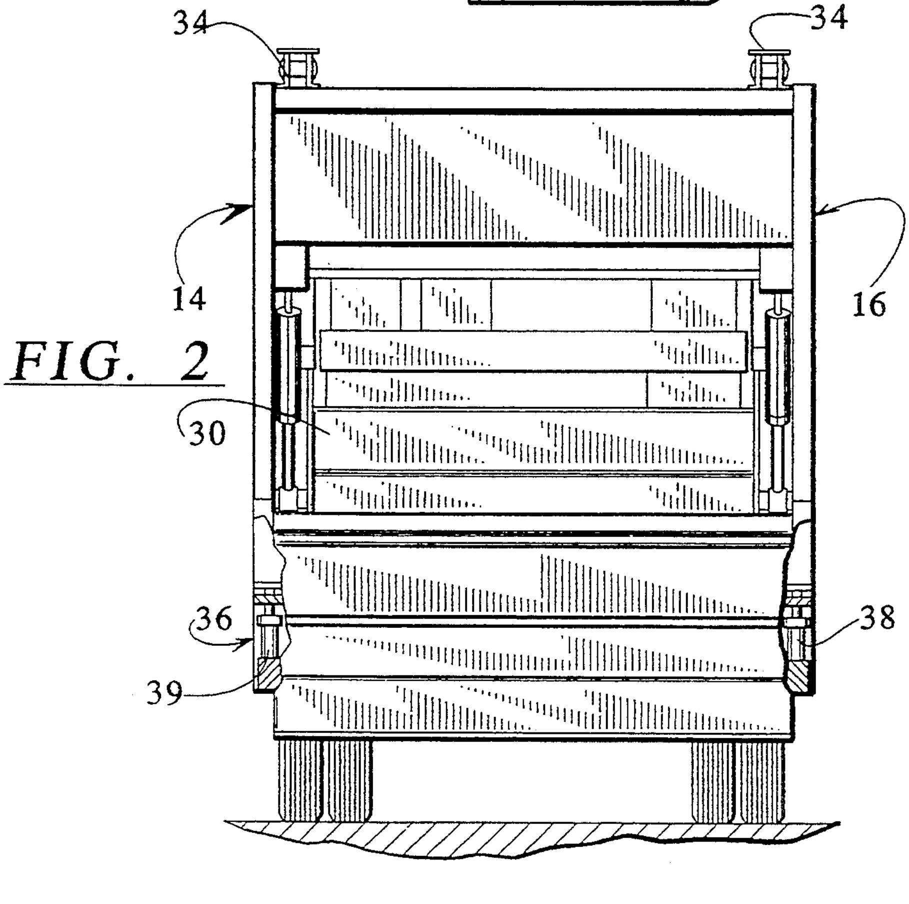
FIG. 2 is a rear view of the rear-loading refuse collection vehicle of FIG. 1, partially cut away to illustrate the tailgate locking mechanism of the present invention.

Referring to FIGS. 1 and 2, a rear-loading refuse collection vehicle includes a wheel-supported truck chassis 10 on which is mounted a refuse container body 12. The container body has side walls 14 and 16, a top wall 18, a bottom wall 20, and an open rear end, the periphery of which is shown at 22. Although a rear-loading vehicle is illustrated, it will be appreciated that the present invention can be used with other types of refuse collection vehicles.

A tailgate 30 is mounted on the top wall 18 of the container body by pivotal mountings 32. The pivotal mountings are positioned at the upper edge of the tailgate, with two pivotal mountings being provided, one at each side of the tailgate. The tailgate is swung upwardly about the pivotal mountings from a closed position, shown in FIG. 1, to a raised or open position, shown in phantom in FIG. 1, by the actuation of a pair of lifting cylinders 34. One end of each lifting cylinder is mounted to the top wall 18 of the container body, while the other end is mounted to the upper end of the tailgate 30. It will be appreciated by those skilled in the art that in other types of refuse collection vehicles, the tailgate need not be mounted to the top wall of the container, but can be mounted to the container body at other locations, such as the sides of the container body.

To lock the tailgate in the closed position, the refuse collection vehicle is provided with a tailgate locking mechanism 36. The locking mechanism 36 includes a pair of hydraulic locking cylinders 38, 39 mounted adjacent to the rear end of the container body, with one hydraulic cylinder being provided at each side of the vehicle. The hydraulic cylinders 38, 39 latch the lower end of the tailgate 30 to the rear end of the container body 12 except when the tailgate is specifically released.

The hydraulic locking cylinders 38, 39 operate sequentially so that the remote hydraulic cylinder 38, which is not visible to the vehicle's operator from the vehicle's driver side, is actuated first, and the second, visible hydraulic cylinder 39 is activated only after the remote cylinder has been latched or unlatched. The sequential operation insures that the hidden hydraulic cylinder is latched or unlatched before the visible cylinder moves, thus eliminating the need to visibly inspect the remote cylinder, or employ sensing devices to detect the position of the remote cylinder.

Figure 3:
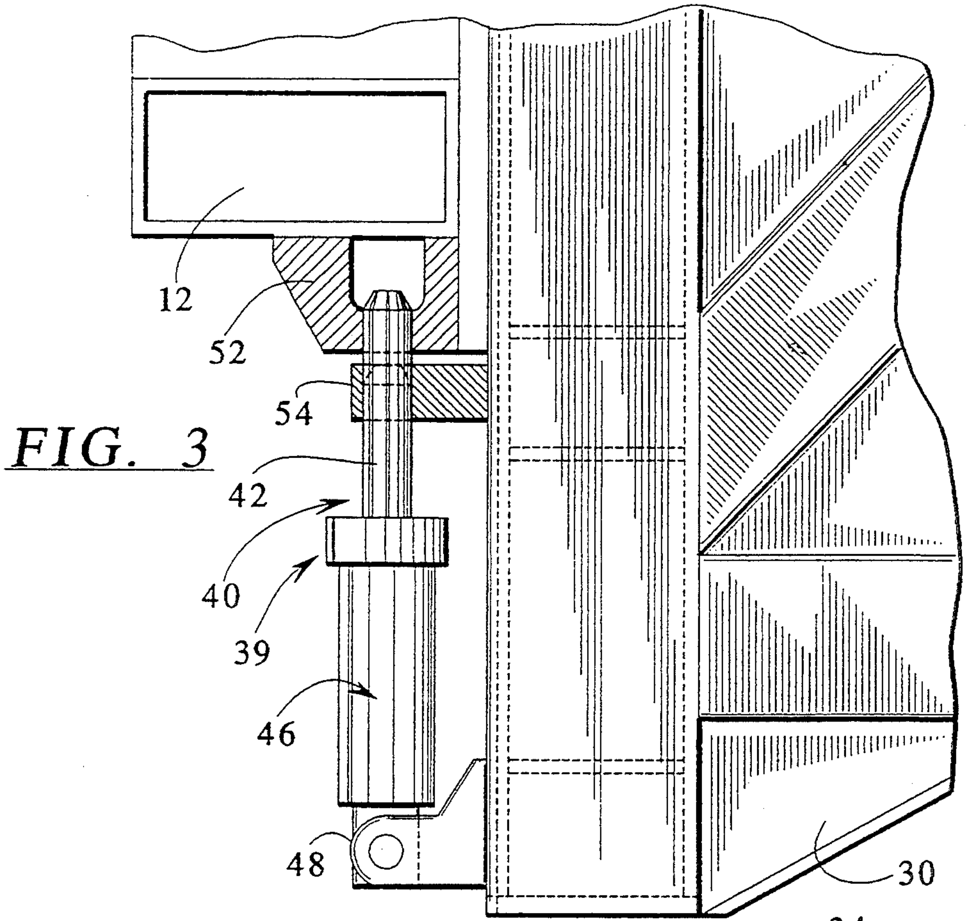
FIG. 3 is a detailed side view of the tailgate locking mechanism of the present invention.
Figure 4:
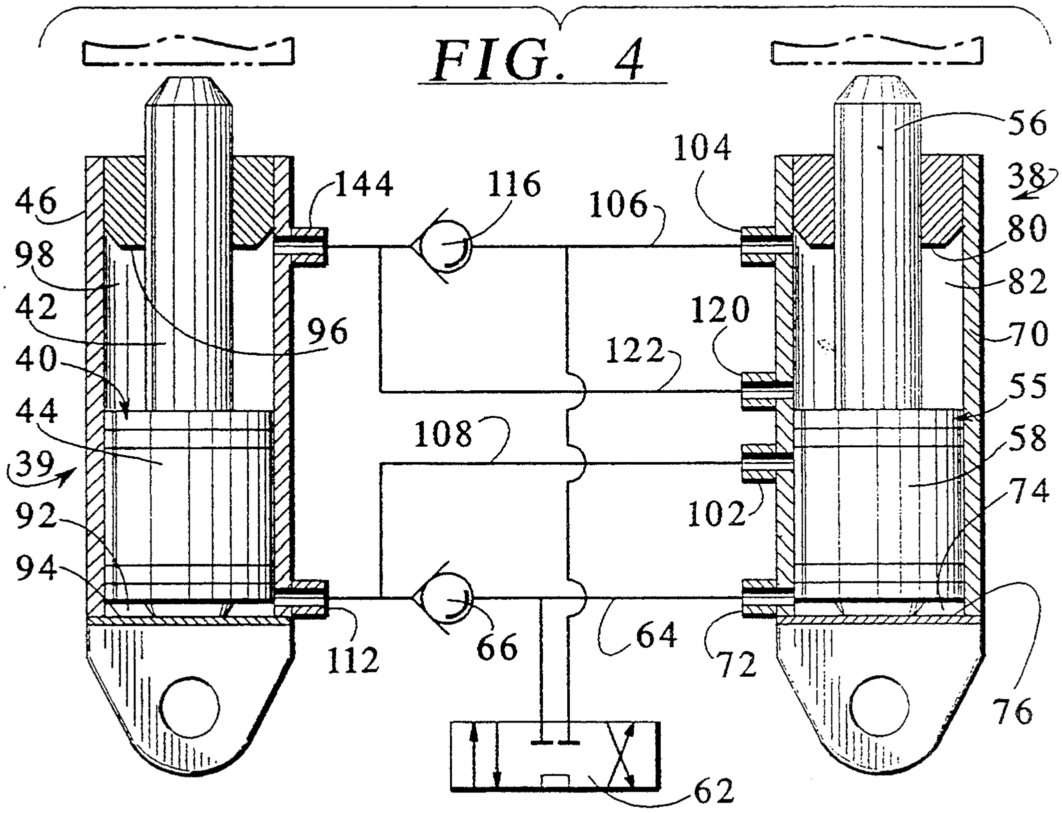
FIG. 4 is a schematic diagram of the tailgate locking mechanism of the present invention showing the locking cylinders in an unlatched position.
Figure 5:
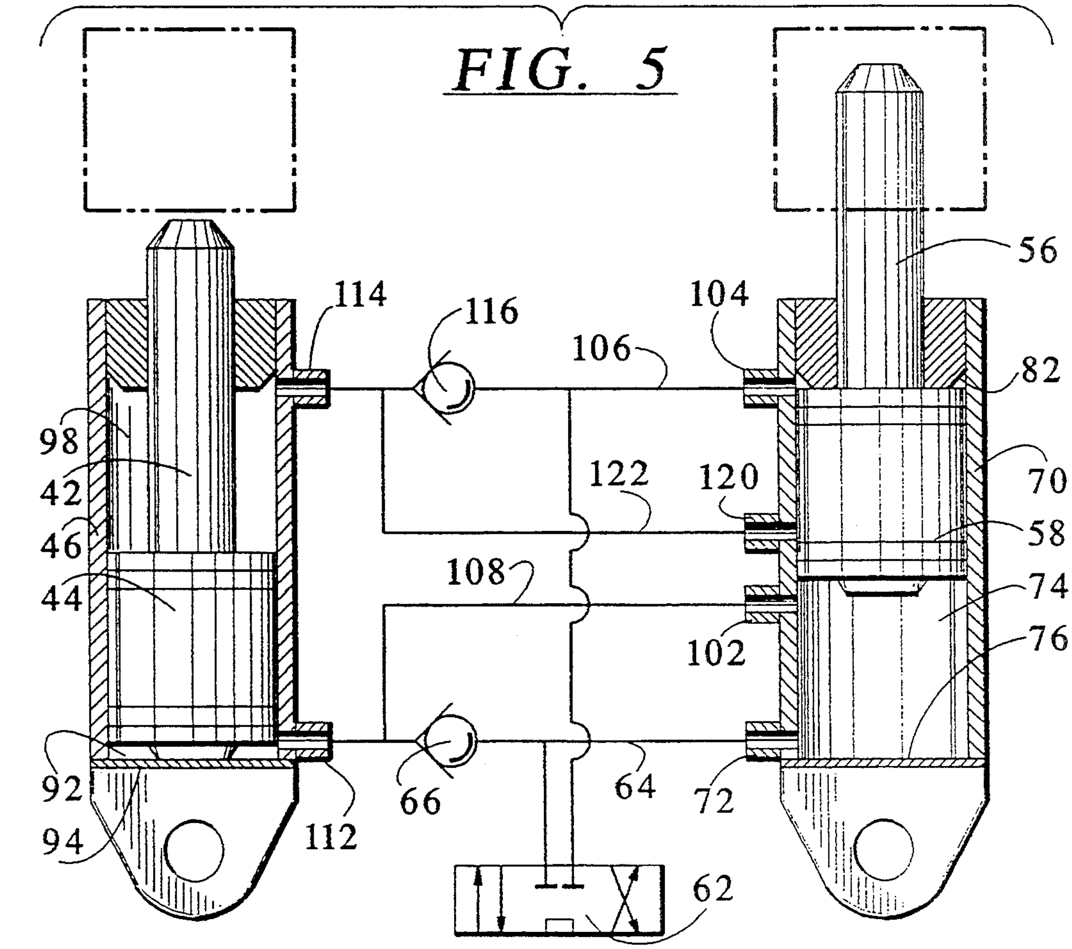
FIG. 5 is a schematic diagram of the tailgate locking mechanism of the present invention showing the first locking cylinder in a latched position.

The locking mechanism of the present invention can be seen in more detail by referring to FIG. 3. The hydraulic locking cylinder 39 includes a piston assembly 40 comprising a piston rod 42 and a piston 44 (FIGS. 4 and 5). The piston assembly is disposed within a cylinder barrel 46. The cylinder assembly is mounted, at its base end, to the tailgate 30 by a mounting pin and bracket assembly 48, and at its rod end, by an apertured guide bracket 54. The hydraulic locking cylinder is positioned so that, when the piston rod 42 is fully extended, it is engaged with an apertured latch bracket 52, mounted to the container body 12, to lock the tailgate 30 to the container body. When the piston rod is retracted, it is withdrawn from the latch bracket 52, as shown by broken lines in FIG. 3, to unlock the tailgate.

As best seen in FIGS. 4 and 5, the hydraulic locking cylinder 38 is similar in construction to the hydraulic locking cylinder 39, and includes a piston assembly 55 comprising a piston rod 56 and a piston 58. The piston assembly is disposed within a cylinder barrel 70 which is divided into a lower chamber 74 and an upper chamber 82. The lower chamber is defined, within the cylinder barrel 70, by a base end wall 76 and the piston 58, and the upper chamber 82 is defined, within the cylinder barrel, by the piston 58 and a rod end wall 80. Similarly, the cylinder barrel 46 of the hydraulic locking cylinder 39 is divided into a lower chamber 92 and an upper chamber 98. The lower chamber is defined by a base end wall 94 and the piston 44, and the upper chamber 98 is defined by the piston 44 and a rod end wall 96.

The sequential operation of the hydraulic locking cylinders will now be explained with reference to FIGS. 4 and 5. In the unlatched position, illustrated in FIG. 4, the pistons 58 and 44 of the hydraulic locking cylinders 38 and 39, respectively, are adjacent the base end walls 76 and 94, respectively, and the upper chambers 82 and 98, respectively, are filled with hydraulic fluid.

Hydraulic fluid from a fluid supply tank (not shown) is directed by a conventional directional control valve 62 to a line 64. The valve 62 is controlled by a control means 65 which is remote from the hydraulic locking cylinders. For example, as illustrated in FIG. 1, the control means can be positioned at the front lower corner of the container body. The line 64 directs the flow of fluid to a port 72 at the base of the hydraulic locking cylinder 38. A check valve 66 is positioned in the supply line 64 to insure that hydraulic fluid is prevented from reaching the hydraulic locking cylinder 39.

The hydraulic fluid passes through the port 72 into the lower chamber 74, where the piston 58 blocks a port 102. As the hydraulic fluid enters the lower chamber 74, causing the piston to extend upwardly, hydraulic fluid in the upper chamber is exhausted out through a port 104 and is returned to the fluid supply tank by a line 106.

When the piston assembly 55 is fully extended into the latched position shown in FIG. 5, the port 102 is uncovered, allowing hydraulic fluid to pass out of the port and through a line 108 to a port 112 at the base of the hydraulic locking cylinder 39. The hydraulic fluid passes through the port 112 into the lower chamber 92, and fluid is exhausted from the upper chamber 98 through a port 114. The exhausted fluid passes through a one way check valve 116 and is returned to the fluid supply tank by the line 106. Hydraulic fluid continues to enter the lower chamber 92 until the piston assembly 40 is fully extended into the latched position.

When it is desired to unlatch the hydraulic locking cylinders, hydraulic fluid from the fluid supply tank is directed by the directional control valve 62 to the line 106 which directs the flow of fluid to the port 104. The one-way check valve 116 in the line 106 prevents the fluid from reaching the hydraulic locking cylinder 39, thus insuring that all the fluid is directed to the port 104. The hydraulic fluid passes through the port 104 into the upper chamber 82, where the piston 58 blocks a port 120.

As hydraulic fluid enters the upper chamber 82, the piston 58 retracts and hydraulic fluid is exhausted from the lower chamber 74 through port 72 and line 64 back to the fluid supply tank. When the piston assembly 55 is fully retracted into the unlatched position shown in FIG. 4, the port 120 is uncovered, allowing hydraulic fluid to pass through a line 122 to the port 114 in the hydraulic locking cylinder 39. The hydraulic fluid passes through the port 114 into the upper chamber 98, and fluid is exhausted from the lower chamber 92 through the port 112. The exhausted fluid passes through the one-way check valve 66 and is returned to the fluid supply tank by the line 64.

Thus, it may be seen that the tailgate locking mechanism of the present invention operates fluidically in a sequential fashion to insure that the downstream visible hydraulic locking cylinder will latch or unlatch only after the upstream remote, or non-visible, hydraulic locking cylinder has latched or unlatched. The sequential operation thus eliminates the need to visibly inspect the remote locking cylinder, and eliminates the need for electronic sensors to detect the position of the remote locking cylinder.

Figure 6:
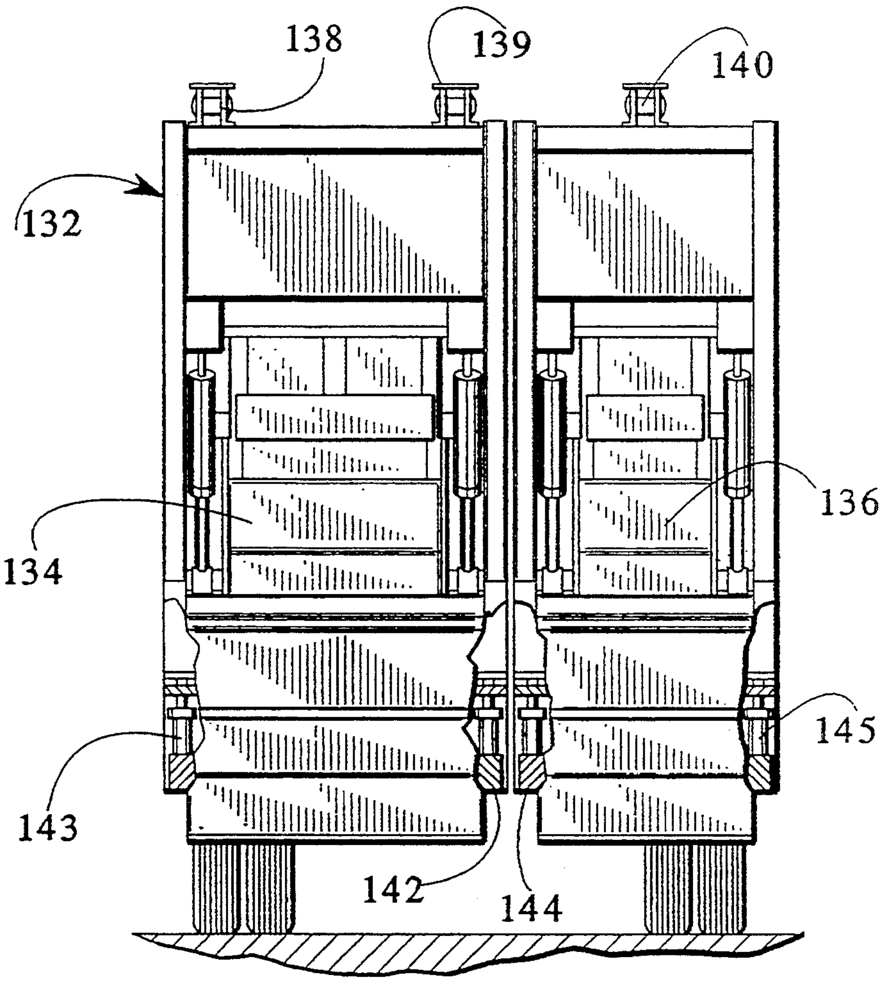
FIG. 6 is a rear view of an alternative refuse collection vehicle, partially cut away to illustrate an alternative embodiment of the present invention.

Turning now to FIG. 6, there is shown the rear of a refuse vehicle, similar to the refuse vehicle of FIG. 1, except that the refuse container body 132 has a vertical divider (not shown) which divides the container body into left and right body compartments. A left and a right tailgate 134, 136, respectively, for closing the open rear ends of the left and right body compartments respectively, are pivotally mounted to the top wall of the container body 132. The tailgates are swung upwardly about their pivotal mountings from a closed position, shown in FIG. 6, to a raised or open position. The left tailgate 134 is raised and lowered by the actuation of a pair of lifting cylinders 138, 139, while the actuation of a single lifting cylinder 140 raises the right tailgate 136.

Each of the tailgates 134 and 136 is locked in the closed position by a tailgate locking mechanism like that described in connection with FIGS. 1–5. Inner and outer hydraulic locking cylinders 142 and 143, respectively, are provided adjacent the inner and outer sides, respectively, of the tailgate 134, while inner and outer hydraulic locking cylinders 144 and 145, respectively, are provided adjacent the inner and outer sides, respectively, of the tailgate 136. Because the inner hydraulic locking cylinders 142 and 144 are hidden from view when the tailgates 134 and 136 are closed, it is virtually impossible to see whether the inner cylinders are locked or unlocked. The hydraulic locking cylinders 142, 143, 144 and 145 are therefore sequenced in the manner described in connection with FIGS. 4 and 5, so that the inner locking cylinders 142, 144 are actuated first. Only after the inner locking cylinders have been fully extended or retracted do the outer, visible locking cylinders 143 and 145 begin to move.

Preferably, the inner and outer locking cylinders 142 and 143 for the tailgate 134 are operated on one hydraulic circuit, while the inner and outer locking cylinders 144, 145 for the tailgate 136 are operated on a second, independent hydraulic circuit. This arrangement permits the tailgate 134 to be locked or unlocked separately from the tailgate 136. Alternatively, the hydraulic locking cylinders may be operated in series on the same hydraulic circuit, with each of the locking cylinders fluidically connected to the others. When a single circuit is employed, the hydraulic locking cylinders are sequenced so that either of the two inner locking cylinders 142 or 144 is actuated first, the other inner locking cylinder is second, the outer locking cylinder 145 is third, and the outer locking cylinder 143, which is visible to the vehicle operator, is actuated last. The sequencing mechanism is like that described in connection with FIGS. 4 and 5, so that the first actuated inner cylinder must be fully extended before fluid can be directed to the second inner cylinder, the second inner cylinder must be fully extended before the outer locking cylinder 145 receives the fluid, and the outer locking cylinder 145 must be fully extended before the visible outer locking cylinder 143 receives the fluid. The same sequence occurs when the cylinders are retracted.

Thus, it may be seen that the present invention provides a simple and effective mechanism for locking the tailgate to the body of a refuse vehicle, without the need to inspect the remote or hidden locking cylinder or to employ multiple sensors to determine the locking position. It will be appreciated that the locking mechanism disclosed herein may be embodied in other specific forms without departing from the spirit or central characteristics thereof. For example, although the hydraulic locking cylinders illustrated in FIGS. 1–6 are mounted vertically on the refuse collection vehicle, it will be appreciated by those skilled in the art that the hydraulic locking cylinders can be mounted horizontally. Also, it will be appreciated that the locking mechanism can be mounted so that the hydraulic locking cylinders are mounted on the container body and the apertured latch brackets are mounted on the tailgate. Further it may be desirable to employ three hydraulic locking cylinders, rather than two, for the single tailgate illustrated in FIGS. 1 and 2. When three hydraulic cylinders are employed, the cylinders are mounted adjacent the rear end of the container body with one cylinder at each side of the body and one cylinder in the middle. The locking cylinders are sequenced so that the locking cylinder which is visible to an operator operating the control means receives hydraulic fluid last, only after the other two locking cylinders have been fully extended or retracted.

The preferred embodiment described herein is to be considered in all respects as illustrative and not restrictive, the scope of the invention being indicated by the appended claims, rather than by the foregoing description of the preferred embodiment, and all changes which come within the meaning and range of equivalency of the claims are intended to be embraced therein.

What is claimed is:

1. A refuse collection vehicle comprising:

a refuse container body having an open end, a tailgate mounted on the refuse container body for movement between a closed position, wherein the tailgate covers the open end, and an open position, wherein the open end is uncovered, and a tailgate locking mechanism for locking the tailgate when the tailgate is in the closed position, the tailgate locking mechanism comprising:

first and second means for locking the tailgate into the closed position, the first and second locking means being moveable between a tailgate locked position and a tailgate unlocked position; and first and second means for selectively moving the first and second locking means, respectively between their locked and unlocked positions so that the second locking means is moved to its tailgate locked position only after the first locking means is moved to its tailgate locked position.

2. A refuse collection vehicle as claimed in claim 1, wherein the moving means moves the second locking means into its tailgate unlocked position only after the first locking means is moved to its tailgate unlocked position.

3. A refuse collection vehicle as claimed in claim 1, which includes means for actuating the first and second moving means; wherein the actuating means is mounted on the vehicle for actuation by an operator; and wherein the second locking means is visible to the operator when actuating the actuation means.

4. A refuse collection vehicle as claimed in claim 1, wherein the first locking means comprises a first fluid operated cylinder assembly, and the second locking means comprises a second fluid operated cylinder assembly, the first and second cylinder assemblies each having a piston and a piston rod.

5. A refuse collection vehicle as claimed in claim 4, wherein the first and second locking means include means for engaging the piston rods of the first and second cylinder assemblies when the piston rods are fully extended.

6. A refuse collection vehicle as claimed in claim 5, wherein the engaging means comprise first and second apertured latch brackets, and wherein the first and second cylinder assemblies are positioned so that when the piston rod of the first cylinder assembly is fully extended it engages with the first apertured latch bracket and when the piston rod of the second cylinder assembly is fully extended it engages with the second apertured latch bracket.

7. A refuse collection vehicle as claimed in claim 6, wherein the first and second apertured latch brackets are each mounted on a respective side of the refuse container body adjacent the rear end of the vehicle, and the first and second cylinder assemblies are each mounted on a respective side of the tailgate.

8. A refuse collection vehicle as claimed in claim 4, wherein the first cylinder assembly receives fluid under pressure from a source of pressurized fluid; and the moving means includes means for selectively preventing the fluid from passing from the source of pressurized fluid to the second cylinder assembly.

9. A refuse collection vehicle as claimed in claim 4, wherein the first cylinder assembly receives fluid under pressure from a source of pressurized fluid; and the moving means includes means for preventing the fluid from passing from the first cylinder assembly to the second cylinder assembly until after the first cylinder assembly has been moved from its tailgate locked position to its tailgate unlocked position or vice versa.

10. A refuse collection vehicle as claimed in claim 9, wherein the preventing means includes a connecting port for passing the fluid from the first cylinder assembly to the second cylinder assembly; and wherein the piston of the first cylinder assembly is moveable from a first position, where it blocks the connecting port to prevent passage of the fluid to the second cylinder assembly, to a second position, where it opens the connecting port to allow passage of the fluid from the first cylinder assembly to the second cylinder assembly.

11. A refuse collection vehicle comprising a refuse container body having a first side, a second side, and an open end, a tailgate mounted on the refuse container body for movement between a closed position, wherein the tailgate covers the end, and an open position, wherein the open end is uncovered, the tailgate having a first side adjacent the first side of the container body and a second side adjacent the second side of the container body, and a tailgate locking mechanism comprising:

first means and second means for locking the tailgate into the closed position, the first and second locking means being mounted adjacent the first and second sides, respectively, of the tailgate and being selectively moveable between a tailgate locked position and a tailgate unlocked position; and means for moving the first and second locking means so that the second locking means is moved to its tailgate unlocked position only after the first locking means is moved to its tailgate unlocked position.

12. A refuse collection vehicle as claimed in claim 11, wherein the moving means initiates movement of the second locking means to its tailgate locked position only after the first locking means has been moved to its tailgate locked position.

13. A refuse collection vehicle comprising a refuse container body having a first side, a second side, and an open rear end; a tailgate having an upper edge pivotally mounted to the refuse container so that the tailgate can be pivoted between a closed position, when the tailgate covers the rear end, and an open position, when the tailgate is raised to reveal the rear end; and a tailgate locking mechanism for locking the tailgate when the tailgate is in the closed position, the tailgate locking mechanism comprising:

first and second apertured latch brackets mounted on the first and second sides, respectively, of the container body adjacent the rear end;

first and second fluid operated cylinder assemblies, each of which includes a piston assembly having a piston and connected piston rod moveable in the cylinder assembly between a piston rod extended position and a piston rod retracted position; the first and second cylinder assemblies being mounted on the tailgate and positioned so that the piston rod of the first cylinder assembly projects into the first apertured latch bracket when the piston rod is in its extended position and the piston rod of the second cylinder assembly projects into the second apertured latch bracket when the piston rod is in its extended position thereby locking the tailgate into its closed position, and means for automatically sequencing the actuation of the cylinder assemblies so that the second piston rod is moved to its extended position only after the first piston rod is moved to its extended position, and is moved to its retracted position only after the first piston rod is moved to its retracted position.

14. A refuse collection vehicle as claimed in claim 13, wherein the first cylinder assembly receives fluid under pressure from a source of pressurized fluid, and the sequencing means includes a valve means for preventing the fluid from passing from the source of pressurized fluid to the second cylinder assembly.

15. A refuse collection vehicle as claimed in claim 13 wherein the first cylinder assembly receives fluid under pressure from a source of pressurized fluid, and the sequencing means prevents the fluid from passing from the first cylinder assembly to the second cylinder assembly until the piston rod of the first cylinder assembly is moved from its extended position to its retracted position or vice versa.

16. A refuse collection vehicle as claimed in claim 15, wherein the sequencing means includes a connecting port for passing the fluid from the first cylinder assembly to the second cylinder assembly; and wherein the piston of the first cylinder assembly is moveable from a first position, where it blocks the connecting port so as to prevent passage of the fluid to the second cylinder assembly, to a second position, where it opens the connecting port to allow passage of the fluid from the first cylinder assembly to the second cylinder assembly.

17. A refuse collection vehicle as claimed in claim 13, which includes means for actuating the sequencing means; wherein the actuation means is mounted on the vehicle for actuation by an operator; and wherein the second cylinder assembly is visible to an operator when actuating the actuating means.

18. A refuse collection vehicle comprising a refuse container body having a first side, a second side, and an open rear end, at least one tailgate having a first side, a second side, and an upper edge pivotally mounted to the refuse container so that the tailgate can be pivoted between a closed position, when the tailgate covers at least a portion of the rear end, and an open position, when the tailgate is raised to reveal the portion of the rear end, and a tailgate locking mechanism for locking the tailgate when the tailgate is in the closed position, the tailgate locking mechanism comprising:

at least two fluid operated and interconnected cylinder assemblies mounted adjacent to the first and second sides, respectively, of the tailgate and each including a piston and connected piston rod; at least one of the cylinder assemblies being visible to an operator when adjacent to the first side of the container body and fluidically located downstream of the other of the cylinder assemblies, the cylinder assemblies being moveable between an unlatched position, wherein the piston rod is retracted, and a latched position, wherein the piston rod is extended;

means for engaging the piston rod of each cylinder assembly when the piston rod is in its extended position to lock the tailgate to the container body in the closed position; and means for sequencing the actuation of the cylinder assemblies so that the piston rod of the visible cylinder assembly is moved to its extended position only after the piston rod of the other of the cylinder assemblies is moved to its extended position, and is moved to its retracted position only after the piston rod of the other of the cylinder assemblies is moved to its retracted position.

19. A refuse collection vehicle as claimed in claim 18, wherein the refuse collection vehicle has two tailgates, in side-by-side relation, with each tailgate having an inner side disposed adjacent to the other tailgate and an outer side disposed away from the other tailgate; wherein a fluid operated cylinder assembly is mounted adjacent the inner and outer sides of each of the tailgates, and wherein the sequencing means permits piston rods of the cylinder assemblies adjacent the outer sides to be moved to their extended positions only after the piston rods of the cylinder assemblies adjacent the inner sides have been moved to their extended positions, and permits the piston rods of the cylinder assemblies adjacent the outer sides to be moved to their retracted positions only after the piston rods of the cylinder assemblies adjacent the inner sides are moved to their retracted positions.

20. A refuse collection vehicle as claimed in claim 19, wherein the cylinder assemblies are fluidically connected in a single, series circuit so as to provide sequential operation of the cylinder assemblies.

21. A refuse collection vehicle as claimed in claim 19, wherein the sequencing means includes two parallel fluid circuits, with the cylinder assemblies mounted adjacent to one of the tailgates connected on one fluid circuit, and the cylinder assemblies mounted adjacent to the other of the tailgates connected on the second fluid circuit, to provide independent sequential operation of each set of cylinder assemblies for locking and unlocking each tailgate.

* * * * *